(12) United States Patent
Hager et al.

(10) Patent No.: US 12,181,118 B2
(45) Date of Patent: Dec. 31, 2024

(54) VEHICLE COMPONENT, VEHICLE AND METHOD

(71) Applicant: Osram Continental GmbH, Munich (DE)

(72) Inventors: Juergen Hager, Herbrechtingen (DE); Joachim Stoehr, Giengen (DE); Oliver Hering, Niederstotzingen (DE); Stephan Schwaiger, Herbrechtingen (DE); Oliver Woisetschlaeger, Sontheim (DE)

(*) Notice: Subject to any disclaimer, the term of this patent is extended or adjusted under 35 U.S.C. 154(b) by 0 days.

(21) Appl. No.: 17/605,519

(22) PCT Filed: May 8, 2020

(86) PCT No.: PCT/DE2020/062865
§ 371 (c)(1),
(2) Date: Oct. 21, 2021

(87) PCT Pub. No.: WO2020/229344
PCT Pub. Date: Nov. 19, 2020

(65) Prior Publication Data
US 2024/0302013 A1    Sep. 12, 2024

(30) Foreign Application Priority Data

May 10, 2019   (DE) .......................... 102019112325.9
Jun. 17, 2019   (DE) .......................... 102019116364.1

(51) Int. Cl.
*F21S 41/32*   (2018.01)
*B29C 45/14*   (2006.01)
(Continued)

(52) U.S. Cl.
CPC ........ *F21S 41/32* (2018.01); *B29C 45/14008* (2013.01); *B29D 11/0074* (2013.01);
(Continued)

(58) Field of Classification Search
CPC ................ B60Q 1/0088; B60Q 1/0441; B29C 45/14008; B29D 11/0074; F21S 41/28; F21S 41/32; F21S 45/50
See application file for complete search history.

(56) References Cited

U.S. PATENT DOCUMENTS

| 6,152,590 A | 11/2000 | Fuerst et al. ............... F21S 8/10 362/545 |
| 6,441,943 B1* | 8/2002 | Roberts ................... G02F 1/157 359/522 |

(Continued)

FOREIGN PATENT DOCUMENTS

| CN | 106104144 A | 11/2016 |
| CN | 106885146 A | 6/2017 |

(Continued)

OTHER PUBLICATIONS

International Search Report dated Nov. 13, 2020 from the European Patent Office in the related PCT application PCT/EP2020/062865 (6 pages).

(Continued)

*Primary Examiner* — Anne M Hines

(57) ABSTRACT

According to the invention, a vehicle component is provided that is formed as a trim part or body part or bumper as well. The vehicle component forms at least one housing part for a light emitter.

22 Claims, 7 Drawing Sheets

(51) Int. Cl.
  *B29D 11/00* (2006.01)
  *B60Q 1/00* (2006.01)
  *B60Q 1/04* (2006.01)
  *F21S 41/20* (2018.01)
  *F21S 45/50* (2018.01)
  *B29K 33/00* (2006.01)
  *B29K 55/02* (2006.01)
  *B29K 69/00* (2006.01)
  *B29L 11/00* (2006.01)
  *B29L 31/00* (2006.01)
  *B29L 31/28* (2006.01)

(52) U.S. Cl.
  CPC ......... *B60Q 1/0088* (2013.01); *B60Q 1/0441* (2013.01); *F21S 41/28* (2018.01); *F21S 45/50* (2018.01); *B29C 45/14* (2013.01); *B29K 2033/12* (2013.01); *B29K 2055/02* (2013.01); *B29K 2069/00* (2013.01); *B29L 2011/0016* (2013.01); *B29L 2031/28* (2013.01); *B29L 2031/747* (2013.01)

(56) References Cited

U.S. PATENT DOCUMENTS

| | | | |
|---|---|---|---|
| 7,641,371 B2 | 1/2010 | Effner et al. | B60Q 1/00 362/487 |
| 10,793,057 B2 | 10/2020 | Stoehr et al. | B60Q 1/04 |
| 2003/0002179 A1 | 1/2003 | Roberts et al. | B60Q 1/26 359/838 |
| 2019/0063706 A1 | 2/2019 | Feil et al. | F21S 41/192 |

FOREIGN PATENT DOCUMENTS

| | | |
|---|---|---|
| DE | 102004039004 A1 | 2/2006 |
| DE | 102010003364 | 11/2011 |
| DE | 202014003075 U1 | 5/2014 |
| DE | 102015221605 A1 | 5/2017 |
| DE | 102017006693 A1 | 1/2018 |
| DE | 102017102317 A1 | 8/2018 |
| DE | 102017204527 A1 | 9/2018 |
| FR | 2920726 A1 | 3/2009 |
| FR | 2925417 A1 | 6/2009 |
| WO | WO2000/55685 A1 | 9/2000 |

OTHER PUBLICATIONS

Search Report dated Nov. 22, 2019 from the German Patent Office in the priority German application DE 102019116364.1 (9 pages).
English translation of the Search Report dated Nov. 22, 2019 from the German Patent Office. (5 pages).
English translation of the Written Opinion of the International Searching Authority prepared by the European Patent Office in the international application PCT/EP2020/062865 as forwarded to the Int'l Bureau of WIPO (6 pages).
Office action dated Feb. 27, 2024 of the Chinese Patent Office in a related Chinese patent application CN202080034897.3, as well as an English translation of the Chinese Office action (19 pages).

\* cited by examiner

VEHICLE COMPONENT, VEHICLE AND METHOD

CROSS REFERENCE TO RELATED APPLICATION

This application is a U.S. National Stage entry under 35 U.S.C. § 371 based on International Application No. PCT/DE2020/062865, filed on May 8, 2020, which was published under PCT Article 21(2) and which claims priority to German Application No. 102019112325.9, filed on May 10, 2019 and to German Application No. 102019116364.1, filed on Jun. 17, 2019. The disclosure of each of the foregoing documents is incorporated herein by reference.

TECHNICAL FIELD

The invention relates to a vehicle component, a vehicle and a method of manufacturing the vehicle component.

BACKGROUND

Until now, lighting functions in automobiles have been realized by headlights, such as front headlights or rear headlights, wherein the headlights are a separate unit, separate from the rest of the vehicle, and have many components, such as an optical system, a light source, electronics, heat sinks, and so on. The components are usually accommodated in a separate housing, i.e., a headlight housing. The headlight, formed from the housing with the components, is then electronically and mechanically connected to the car and often also has a thermal interface.

The headlight also has a transparent cover lens through which the light from the light source located in the headlight shines. The cover glass additionally protects the components from the outside, i.e., for example, from water ingress and/or dirt. This cover lens can be seen when looking at the car, and therefore the cover lens and the headlight should be fitted especially precisely into the body or external shell of the vehicle so that no different gap dimensions can be seen, such that the vehicle shows good quality of workmanship when viewed from the outside. This means that the mechanical and electrical interfaces between the headlight and the vehicle must be very precisely machined and are therefore highly complex.

SUMMARY

One object of the invention is to create, under device construction considerations, a simple and cost-effective vehicle component that is operatively connected to a light. Another object of the invention is to provide a vehicle with the vehicle component that is low-cost and, under device construction considerations, simple.

Furthermore, it is an object of the invention to provide a simple and inexpensive method of manufacturing the vehicle component.

The objects of the invention with respect to the vehicle component, the vehicle and the manufacturing of the vehicle component are solved by the features of the claims. Especially advantageous embodiments are recited in the dependent claims.

According to the invention, a vehicle component is provided, wherein the vehicle component may be formed as a trim part or body part or bumper. Furthermore, the vehicle component forms at least a housing part of a light housing for an emitter wherein the latter can be integrated into the vehicle component. Preferably, the emitter is formed as a lighting unit (luminous unit) that emits light, especially visible light. Alternatively or additionally, the emitter may emit electromagnetic or acoustic waves, for example. Furthermore, the emitter may also be formed as a sensor, for example as a pressure sensor and/or temperature sensor and/or as a contact sensor and/or as an acceleration sensor. In a further embodiment, it would also be conceivable that the emitter performs a LIDAR function (light detection and ranging function). Furthermore, it is also conceivable to integrate a camera system into the light housing. For example, the bumper of a vehicle may at least partially form at least part of a light housing, and into this housing part the light unit may be inserted so that the housing part and the light unit are formed, for example, as fog lamps. Front and/or rear headlights and/or (turn) indicators and/or high beams may also be integratable into various vehicle components.

An advantage of the present invention is that the emitter, especially as the lighting unit, can be integrated directly into the housing part that forms the vehicle component. This means that an alignment of the housing part to the vehicle component is not necessary during assembly—at most during the manufacture of the vehicle component—and that thus a work step can be saved during assembly. This makes the production and/or manufacturing of a vehicle with the vehicle component that has a lighting function more cost-effective, and moreover the manufacturing is less complex. In other words, the assembly of a conventional headlight and the alignment of the conventional headlight to the rest of the vehicle is not necessary. Furthermore, the mechanical connection between a conventional headlight and a vehicle component is eliminated, meaning that the complexity essential for making a mechanical connection accurate enough for an observer to perceive a good quality of workmanship of the vehicle is reduced. Furthermore, with the invention fewer components are required compared to the conventional design of a headlight having a housing in that the lighting unit is disposed, since in the present invention the housing part can be formed by the vehicle component. This also simplifies the assembly of a vehicle and thus improves the manufacturing cost.

It is alternatively or additionally possible that the vehicle component is partially formed as an optical element that is installed without direct contact to an emitter. An emitter that is spaced apart from the optical element may, for example, radiate light into the optical element.

This is advantageous since it allows, for example, a vehicle headlight to be easily integrated into the vehicle having the vehicle component. When the optical element is, for example, an optical system that forms a high beam together with a lighting unit, it is possible to integrate this into the vehicle easily and inexpensively in terms of the device because, for example, the headlight cover of a conventional headlight is thus obsolete. Furthermore, it is not necessary to seal the high beam consisting of the optical element and the spaced lighting unit from the outside. The optical device may also be used as optics for, for example, a low beam light and/or a turn indicator and/or as a cornering light.

Preferably, the housing part is connected to the vehicle component in a materially bonded and/or form-fitting manner. For example, the housing part may be overmolded. That is, the housing part may first be manufactured, for example by injection molding, and then the housing part is inserted into a die and overmolded. The product thus obtained can then be the vehicle component that forms a housing part.

Preferably, the housing part is overmolded in such a way that the connection between the housing part and the vehicle component is dirt-tight and/or water-tight, and thus no particles and/or water can penetrate to the lighting unit. Furthermore, the otherwise usual gaps between the headlight and the exterior trim are avoided, which can also produce a design effect and is aesthetically utterly attractive.

In a further embodiment, the housing part may be formed integrally with the vehicle component, for example, by manufacturing the vehicle component (or a part of the vehicle component) with the housing part from one material, preferably in one operation. For example, the vehicle component may be produced with the housing part by an injection molding process. This is advantageous because the manufacturing of the vehicle component with the housing part can thus be very simply and inexpensively performed.

It would also be conceivable to use a two-component injection molding process, wherein the vehicle component would be a first component and the housing part a second component. A 3D printing process would also be conceivable, which would be especially advantageous for small series, complex component configurations and elements to be individually co-designed by customers, such as logos with customer initials.

Preferably, the housing part is at least partially formed as an optical element. The light (visible, infrared) emittable by the lighting unit can then preferably radiate through the optical element. In other words, the lighting unit may be integrated in the housing part, wherein the housing part is at least partially or completely translucent and forms the optical element. Preferably, the optical element that is at least a part of the housing part is arranged on the vehicle component such that it is visible from the outside when the vehicle component is integrated on a vehicle. This is advantageous because thus the lighting unit, which is preferably integrated in the housing part, is protected from dirt and/or water from the outside by the optical element that is a housing part. A further advantage is the saving of a cover plate, which is now no longer required, because its function is taken over directly by the optical element. A further advantage is that there is no gap between the optical element and the vehicle component, wherein the vehicle component may be, for example, a body part, such as a fender and/or a hood and/or a bumper and/or a radiator grille and/or an exterior mirror and/or a tailgate and/or an actuated body element, for example a spoiler. Preferably, the optical element is further configured to make especially efficient use of the light from the lighting unit. For example, the body element and the lighting unit may form a low beam light. The included optical element can influence the light such that it illuminates a road on which a vehicle comprising the vehicle component runs especially well.

The optical element may be formed as a refractive optical element, for example, as a lens, especially as a directly imaging lens, and/or as a collimator and/or as a light conductor. It is also possible that the optical element is a combination of different optical elements, which has a refractive optical element at least at the place in the beam path furthest from the light source. Especially, the optical element may have an out-coupling (decoupling) and light control mechanism (total internal reflection (TIR)) on outer surfaces and/or may, alternatively or additionally, have a reflective coating on the rear side such that the light from the lighting unit can preferably be radiated completely in a desired direction, for example in the direction of a road on which the vehicle having the optical device is arranged.

Preferably, the optical element may have an aspherical surface such that imaging aberrations of the optical element can be prevented.

Preferably, the vehicle component is cupped shell-like. The housing part may then form a cup part (shell part), for example.

The housing part may extend towards the vehicle interior, especially when the vehicle component is in an assembled state. The housing part may be formed, for example, as a mounting protrusion and/or as an optical element, as explained above.

Preferably, the optical element of the housing part is formed as an optical free-form surface (e.g., as a collimator) and tapers in the direction away from the vehicle component. The larger end surface of the housing part preferably forms an outer surface section of the vehicle component and can serve as a light opening for the lighting unit. A mounting interface for the lighting unit may be installed into the smaller end surface, for example, in the form of a blind-hole-shaped recess. The mounting interface is formed, for example, as part of a bayonet catch. In a further embodiment, the housing part that is formed as an optical element may also be elongated, for example, as an encapsulated light conductor. Alternatively or additionally, it is conceivable that, for example, a frustoconical, outer shell surface of the housing part is preferably formed as a TIR surface or formed to be reflective in order to guide as much light as possible from the lighting unit to the outside.

The housing part, especially the optical element, may have a radial collar that is cast around by the vehicle component and forms a kind of fastening anchor. It is conceivable to provide a further radial collar that engages radially outwardly over the outer surfaces of the vehicle component. The collars may then form a groove running around the housing part into which the vehicle component is then cast, thus creating a tongue-and-groove connection. The radial collar or the radial collars are preferably formed all around and completely circumferential to the outer cover surface of the housing part, whereby the radial collar or the radial collars serve as a sealing section.

Alternatively or additionally, one or more further optical elements may be arranged on the vehicle component. This may be formed, for example, as a headlight cover. That is, the housing part may form a receptacle at which the lighting unit can be mounted, whereby the housing part may have an opening in the direction of the beam direction of the lighting unit. The further optical element may preferably close this opening. The further optical element may be connected to the vehicle component in a form-fitting and/or force-fitting manner. For example, the further optical element may be mounted to the vehicle component with screws and/or with another mechanical connection. In other words, the housing part may form a receptacle for the lighting unit to which the lighting unit is mountable, and the light from the light source of the lighting unit can then radiate through the further optical element.

Preferably, the optical element and/or the further optical element may be configured as a collimator and/or light conductor and/or lens and have an out-coupling region and an in-coupling region. The out-coupling region of the optical element may be planar or curved according to the outer surface of the vehicle component surrounding the out-coupling region. Furthermore, the optical element may include additional structures, for example, as disclosed in DE 202014003075 U1, the subject matter of which is incorporated herein by reference.

Alternatively or additionally, the lighting unit is directly mounted to the housing part, for example, by a standardized connection such as a bayonet catch and/or an XLS connector, which is manufactured by Osram as disclosed in DE 102017102317 A1, the subject matter of which is incorporated herein by reference. This is advantageous because a standard lighting unit can thus be integrated into the housing part of the vehicle component, thereby saving further costs. The fact that the lighting unit can be mounted directly to the housing part means that additional components can be saved. This reduces the cost of manufacturing the vehicle component and thus the cost of manufacturing a vehicle that includes the vehicle component. In addition, the vehicle component becomes less complex due to fewer components being used. This is advantageous, for example, with respect to maintenance or part replacement.

In a further embodiment, a connecting part may be provided by which the lighting unit is mounted to at the housing part and/or to the vehicle component. The connecting part may, for example, partially or completely enclose the housing part. This prevents moisture and dirt from depositing on the optically effective outer surface of the collimator and from negatively affecting the light distribution. The outer surface of the collimator can thereby be easily designed as a TIR surface. It is possible to integrate different lighting units into the housing by using different adapter pieces. Thus, the vehicle component can be used for many different applications, and a conversion from one type of lighting unit to another type of lighting unit can be easily implemented.

For example, the connecting part is cup-shaped or socket-shaped. An opening of the connecting part may then point towards the vehicle component. The connecting part is connected to the vehicle component by a face end section at the opening area. A face jacket section of the connecting part is then, viewed in the radial direction, preferably arranged between the vehicle component and the housing part and is connected to the vehicle component and/or the housing part in a form-fitting and/or materially bonded and/or force-fitting manner. A bottom section of the connecting part has, especially centrally, a through opening. This can serve as a mounting interface or standardized connection for the lighting unit. The through opening is preferably formed as part of a bayonet catch, whereby the lighting unit may have the other part. The bottom section is preferably spaced from the housing part, wherein a recess for light in-coupling may be provided in the housing part opposite to the bottom section. A light source of the lighting unit may then be arranged, for example, between the bottom section and the recess.

It would also be conceivable for the, especially socket-shaped, connecting part to have an axial collar projecting from the bottom section towards the vehicle component. Thereby, the connecting part can be easily mounted to the housing part. The preferably frustoconical housing part may then be enclosed by a fastening jacket, which is preferably integrally connected to the housing part. The fastening jacket, which may be formed essentially hollow-cylindrical, extends for example from the wide end section of the housing part towards the bottom section, preferably being spaced from the bottom section. An end section of the fastening jacket facing the bottom section may form a mounting interface or standardized connection, for example a part of a bayonet catch. The axial collar then preferably forms the other mounting interface, especially as part of a bayonet catch. Between the connecting part and the vehicle component, a seal in the form of a sealing lip may be provided, which is preferably mounted to the connecting part and sealingly abuts an inner surface of the vehicle component.

Preferably, moreover, the lighting unit is aligned on the housing part or via by the connecting part by a standardized connection, especially to the optical element and/or to the further optical element. That is, the lighting unit, especially a coupling-out surface for the light of the lighting unit, as well as the optical element and/or the further optical element are aligned in such a way that the light image generated by the lighting unit in connection with the housing part has a good resolution and a good efficiency.

The vehicle component may additionally comprise a protective element. This is configured so as to protect especially the housing part and/or the lighting unit from external influences, such as water and other liquids. Preferably, the protective element surrounds the housing part and/or the light-emitting unit, especially on the rear side, i.e., especially on the side that is not visible from the outside. This is advantageous because sensitive rear structures of the housing part and/or of the lighting unit are thus protected. The protective element may be cup-shaped, for example, when the housing part forms a reflector, or have a U-shaped cross-section, for example, when the housing part forms a light conductor which extends especially longitudinally. The vehicle component may, when a protective element is provided, preferably have at least one projection that preferably extends opposite to a radiation direction, i.e., in the direction of the interior of the vehicle. The projection may, for example, be formed hollow-cylindrical when the protective element is, for example, cup-shaped, and may surround the hollow-cylindrical section of the cup-shaped protective element, especially around the entire circumference. That is, the hollow-cylindrical projection may abut a cylindrical outer circumferential surface of the protective element, especially around the entire circumference of the cup-shaped protective element. When the protective element is U-shaped, the vehicle component may preferably have two projections that extend, especially in parallel, towards the vehicle interior, and the U-shaped protective element may be arranged between the projections, such that outer surfaces of legs of the U-shaped protective element, respectively, abut the projections, especially over their entire surface. The protective element may thus be arranged between the projections. The projections preferably serve to hold the protective element. The protective element may be connected to the vehicle component in a force-fitting and/or form-fitting and/or materially bonded manner. Especially, the protective element is connected to the vehicle component in a form-fitting manner, for example by an elastic latching connection (snap connection) or clip connection. This is advantageous because the protective element can thus be easily disassembled and assembled, for example, for replacing the lighting unit. A part of the at least one latching connection or clip connection may, for example, when the protective element is cup-shaped, be arranged on the outer circumferential surface of the hollow-cylindrical section of the protective element. A corresponding part into which the part of the protective element latches in, snaps in or clips in, for example, may be arranged on an inner cylindrical circumferential surface of the hollow-cylindrical projection of the vehicle component. Especially, the part of the latching connection or clip connection of the protective element may be a latching lug or retaining lug, and the corresponding part of the latching connection or clip connection of the vehicle component may be a recess or through-hole into which the latching lug or retaining lug may be elastically inserted.

When the protective element is U-shaped, a part of the latching connection or clip connection may be arranged, for example, at at least one outer surface of at least one of the legs, and the corresponding part of the vehicle component may be arranged at least at the corresponding one of the parallel extending projections of the vehicle component.

It is also advantageous that a sealed space is formed between the vehicle component and the protective element. To accomplish this, for example, a seal may be arranged between the vehicle component and the protective element. Preferably, the lighting unit may be arranged in the space such that it is protected from dirt or external influences. For example, when the protective element is U-shaped or cup-shaped, the seal may be arranged on at least one end face or end surface of the legs of the U-shaped protective element or on one end face or end surface of the cylindrical part of the cup-shaped protective element. Especially, the seal may be arranged between the end face or end surface of the protective element and the housing part, wherein the housing part may especially comprise an abutting face for the seal. The abutting face may, for example, be arranged on a surface of a projecting web facing the protective element, the web especially projecting in a direction perpendicular to a direction of radiation or along a light conductor. When the protective element has, for example, the latching, snap or clip connection, this may be formed in such a way that the seal is compressed between the protective element and the vehicle component, especially the housing part, so that the seal reliably seals the space. It is also conceivable that the protective element includes a different or additional retaining means that applies a force to the seal to elastically deform the seal.

In a further embodiment, the protective element may be reflectively coated or matt white on a side facing to the vehicle component or be configured such that scattered light from the lighting unit can be directed back towards the housing part. This is advantageous because the efficiency can thus be increased considering that scattered light can be coupled back into the housing part.

The lighting unit may comprise a plurality of components, such as an optical component and/or at least one light source and/or at least one electronic component and/or at least one heat sink and/or at least one illumination carrier.

Preferably, at least the housing part is partially formed as an in-coupling region for the light of the lighting unit, wherein the in-coupling region may be formed as a TIR region. This is advantageous because the light of the lighting unit can be coupled in efficiently. Thus, for example, the light of the lighting unit can be perceived especially well by other road users and/or illumination of the road is especially efficient for the driver of the vehicle. Additionally and/or alternatively, the housing part may be at least partially coated, for example, with a reflective layer and/or for example with protective lacquers.

Furthermore, the lighting unit, especially when the housing part forms an optical element, preferably a light conductor, may also be mountable to the housing part asymmetrically, that is, laterally or on the front side. In other words, light coupling into the optical element is also possible laterally or on an end-face side. That is, the light in-coupling into the optical element, which is preferably a light conductor, can occur parallel to a light-emitting surface or an out-coupling region of the housing part or away from the light-emitting surface or the out-coupling region. Especially, in this embodiment, the housing part has a light out-coupling surface having out-coupling structures via which light in-coupled into the housing part can be guided to the light-emitting surface or out-coupling region. In other words, when the housing part forms a light conductor, light from the lighting unit preferably in-couples into an end surface or end face of the light conductor parallel to an extension direction of the light conductor, and the in-coupled light is guided via the out-coupling structures of the light out-coupling surface to the light-emitting surface or the out-coupling region so as to out-couple.

The housing part may preferably form a light conductor, whereby this may be structured or unstructured with regard to its out-coupling structure at least in sections or in partial sections or completely. The out-coupling structure may comprise conventional prism-like or sawtooth-like or other refractive recesses (holes) or thickenings (bumps). However, it is also possible that out-coupling structures may be roughened areas formed by, for example, sandblasting or lasering. The out-coupling structure may be formed during primary molding, especially during casting, of the housing part in the mold or on the already cast housing part.

Furthermore, it is advantageous that at least one electrical contact, preferably in the form of an electrical line, is integrated in the vehicle component, for example by casting the electrical line in the vehicle component, for example by injection molding. The electrical contact may preferably be connectable to the lighting unit or to a contact of the lighting unit in order to supply the latter with electrical energy. This is especially advantageous because it means that the vehicle component together with the lighting unit is a self-contained system. That is, an electrical contact, that is supplied from the outside in order to supply the lighting unit with electrical energy, is not necessary, and thus a seal around this electrical contact is not required. This means that fewer components are provided in a vehicle comprising the vehicle component due to the vehicle component, which can result in a reduction in manufacturing costs. Furthermore, the vehicle component having a lighting function thus has very few components, which reduces complexity and leads to an easy assembly of the lighting unit. In addition, the electrical line that is located inside the vehicle component is protected from environmental influences, such as marten bites, and erosion due to water ingress is also less likely.

The contacts of the vehicle component and the lighting unit are preferably formed in such a way that the contacts are automatically contacted when the lighting unit is mounted.

Preferably, a contact guide protrusion is formed on the vehicle component that extends inwards next to the housing part. The contact is guided by this, wherein the contact then projects outwards from one end surface of the contact guide protrusion with a contacting section. The contact is preferably flexurally rigid. The contacting section is then preferably connected to the contact of the lighting unit. For example, the contacting section is provided between the connecting part and the housing part.

When the housing part has a fastening jacket, the contacting section may be provided between the latter and the connecting part.

For example, the contact of the lighting unit is simply formed or molded in the connecting part. The contact may then project with a contact section or contact spring section from the connecting part towards the vehicle component. Preferably, the contact is thereby formed in the bottom section, for example, by being cast around by the connecting part. It may then extend outwards from the mounting interface for the lighting unit, for example radially, and then project inwards. Preferably, the contact projects axially between the axial collar and the mantle of the connection part, whereby it is protected mechanically by these parts, for example during assembly. The axial projection of the contacts enables these to be automatically contacted during assembly. The contact spring section then abuts, preferably preloaded, the contact of the vehicle component.

Furthermore, it is advantageous that at least two lighting units are arranged in the housing part. This is especially advantageous when the vehicle component with the at least one housing part and the lighting unit forms a front headlight, because one lighting unit can thus perform the function of a daytime driving light, for example, and the other lighting unit can perform the function of a high beam and/or the function of a low beam. In other words, the housing part may be formed, for example, in such a way that at least two lighting units are mounted thereto and/or at least two optical elements are formed by the housing part.

Preferably, the interior of the housing part is sealed to the outside. For this purpose, for example, at least one seal may be arranged between the lighting unit and the housing part. This is especially advantageous when the lighting unit is mounted directly to the housing part, especially by a standardized connection. When the vehicle component has a connecting part, a seal may be arranged between the connecting part and the lighting unit and/or between the connecting part and the housing part and/or at least between the connecting part and the vehicle component. Preferably, the seal is arranged in such a way that no water and/or no dirt can penetrate into the part of the lighting unit that, for example, comprises the light sources, the optics (or optical sub-areas of the optics) and/or other electronic components, such as a printed circuit board. The seal is preferably compressive, for example, by a compression screw fitting such that the housing part together with the connecting part and/or the lighting unit is dust and water tight at least according to IP 65.

The vehicle component may preferably be made of injection-moldable material, for example of polycarbonate and/or polybutene or polymethyl methacrylate and acrylonitrile butadiene styrene. The housing part may be made of the same material, but also of a different transparent or translucent material. When the housing part is made of the same material, it is especially cost-effective to manufacture the vehicle component with the housing part. When two different materials are used, it is possible, for example, for the vehicle component to have a different hardness and/or flexibility than the housing part. When the vehicle component is formed as a bumper, for example, certain mechanical and thermal properties are important. In other words, the vehicle component can thus be suitably manufacturable for any application.

Preferably, a vehicle is provided that includes the vehicle component. The vehicle may be an air-borne vehicle or a water-borne vehicle or a land-borne vehicle. The land-borne vehicle may be a motor vehicle or a rail vehicle or a bicycle. Especially preferably, the vehicle is a truck or a passenger vehicle or a motorcycle. The vehicle may further be configured as a non-autonomous or semi-autonomous or autonomous vehicle. The vehicle component may also be integrated into a trailer. For example, a part of a caravan may be replaced by the vehicle component.

The at least one light source of the lighting unit may be formed, specifically, as a light-emitting diode (LED, micro-LED, mini-LED), and/or as an organic LED (OLED), and/or as a laser diode, and/or as a light source operating according to a laser-activated remote phosphor (LARP) principle, and/or as a halogen lamp, and/or as a gas discharge lamp (high-intensity discharge (HID)), and/or in connection with a projector working according to a digital light processing (DLP) principle and/or according to a spatial light modulator (SLM). Thus, a multitude of alternatives are available as a light source for the lighting device according to the invention. In addition, the lighting unit may comprise a multiple array including a certain number of individual light sources, which are especially LEDs. Especially, the lighting unit may contain at least two light sources that emit light with at least two different colors, for example, white light and/or orange and/or red light so that a signal light and/or warning light function is applicable in the automotive field by the vehicle component.

It is also possible to integrate at least two housing parts of light housings in the vehicle component. For example, at least two housing parts of light housings may be integrated in a bumper, each of which is part of a fog lamp.

A method of manufacturing the vehicle component preferably has as a first step the making of the housing part, for example, in a separate injection mold. Then, the finished housing part is inserted into a die that forms a negative of the vehicle component. Then, in a further step, the housing part is overmolded so as to produce the vehicle component that is at least partially formed as the housing part. This is advantageous because at least a section of the housing part, if the material is selected appropriately, may be made partially translucent, and thus the housing part can easily and inexpensively be formed at least partially as an optical element.

In a further preferred method of manufacturing the vehicle component, a two-component process may be used, wherein one component forms, for example, a section of the housing part and/or the housing part and is, for example, translucent, and the second component forms the remainder of the vehicle component. The two components may be made of different materials, for example polycarbonate and/or polybutene or polyethyl methacrylate and acrylonitrile butadiene styrene, and it is also possible that the housing part and the vehicle component are made of the same material but have different colors, wherein the optical element is preferably transparent or translucent. This is advantageous because the vehicle component containing the housing part can thus be manufactured in one step. This is especially simple and cost-effective.

In a further method, the vehicle component may be manufactured together with the housing part from a material having one color. In other words, the vehicle component is manufactured together with the housing part using the same injection molding material in one injection molding process, whereby only one type of material is used during the injection molding process. Thereby, for example, the vehicle component may be manufactured completely translucent or partially translucent and thus special effects can be produced.

According to the invention, a vehicle component is provided that is formed as a trim part or body part or bumper as well. Furthermore, the vehicle component has a lighting unit. The vehicle component forms at least one housing part of the lighting unit.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
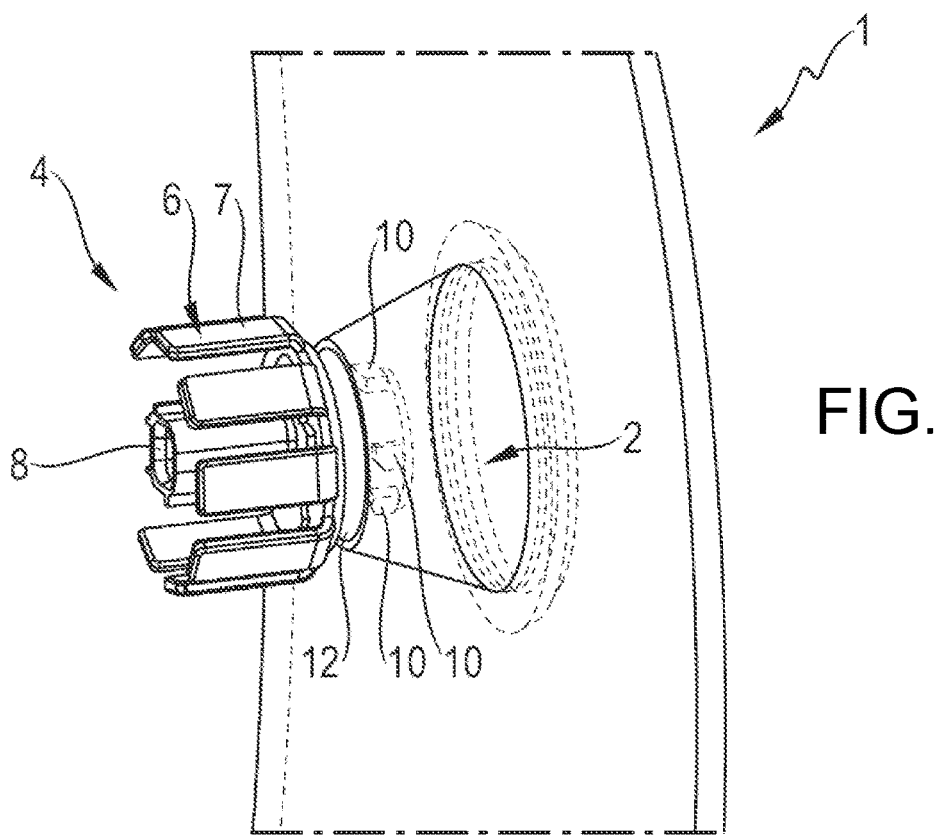
FIG. 1 is a perspective view of a vehicle component into which a lighting unit is integrated, according to a first embodiment.

FIG. 1 shows a vehicle component 1, wherein this is partially formed as a housing part 2 of a light housing. The housing part 2 is formed together with the vehicle component 1, that is, the housing part 2 and the vehicle component 1 are connected in a materially bonded and/or form-fitting manner. The housing part 2 is also made of a translucent material.

The housing part 2 is formed as an optical free-form surface. In this embodiment, the housing part 2 is formed frustoconical with a round cross-section, whereby the housing part 2 extends and tapers away from the vehicle component 1. Alternatively, the housing part 2 may have a different shape. For example, the housing part 2 may be formed as a cuboid. At the end of the housing part 2 that abuts the vehicle component 1, the housing part 2 is formed as an optical element 3, or the housing part 2 may be formed as an optical element 3 as a whole. In other words, it is possible for the housing part 2 to be made of solid material and the entire housing part 2 to be an optical element. Or the housing part 2 can be hollow, and a section of the housing part, for example, an end surface on the vehicle component side, can form the optical element. The housing part 2 closes an opening in the vehicle component 1, preferably in such a way that the vehicle component 1 together with the housing part 2 forms a continuous surface. Where the vehicle component 1 merges into the housing part 2, the housing part 2 is annularly overmolded by the material of the vehicle component 1 in a radial direction of the frustoconical cross-section of the housing part 2.

A lighting unit 4 is disposed at the end section of the housing part 2 that projects away from the vehicle component 1. The lighting unit 4 has a heat sink 6 extending axially away from the housing part 2 and the lighting unit 4. The heat sink 6 may, for example, dissipate heat generated by electronic components, not shown here, and/or by a light source, also not shown here, of the lighting unit 4. The heat sink 6 has a plurality of cooling fins 7 extending individually away from the housing part 2. These are spaced at regular intervals from one another in a circular direction and are each plate-shaped.

Furthermore, the lighting unit 4 has a plug connection 8, whereby this, like the heat sink 6, extends away from the housing part 2. The cooling fins 7 of the heat sink 6 circumferentially surround the plug connection 8. The plug connection 8 is arranged essentially in the center of the housing part 2.

The lighting unit 4 has a part that extends towards the vehicle component 1. The part of the lighting unit 4 that extends towards the vehicle component 1 is surrounded by the housing part 2. Hereby the part of the lighting unit 4 is formed in a cylindrical shape. In other words, the part of the lighting unit 4 that projects away from the plug connection 8, extends from the end section of the housing part 2 towards the vehicle component 1. Protrusions 10 or radial protrusions 10 are formed on this projection and extend radially outwards. These are used to mount the lighting unit 4 to the housing part 2 by engaging in corresponding recesses, not shown here, of the housing part 2. The protrusions 10 are preferably arranged peripherally on an outer surface of the projection part of the lighting unit 4 and project radially away from the part of the lighting unit 4. The protrusions 10 together with the recesses form, for example, a bayonet catch.

Furthermore, an annular seal 12 is arranged between the heat sink 6 and the housing part 2. This seals at least the part of the lighting unit 4 that is located inside the housing part 2 and the housing part 2 from the outside. The seal 12 abuts against an end surface of the housing part 2 facing away from the vehicle component 1 and encloses the lighting unit 4. The seal 12 is supported on an annular surface of the lighting unit 4 and is sealingly tensioned against the end surface. On the part of the lighting unit 4 on which the protrusions 10 are arranged, for example, a light source is arranged for which the light thereof can be in-coupled into the housing part 2.

Figure 2:
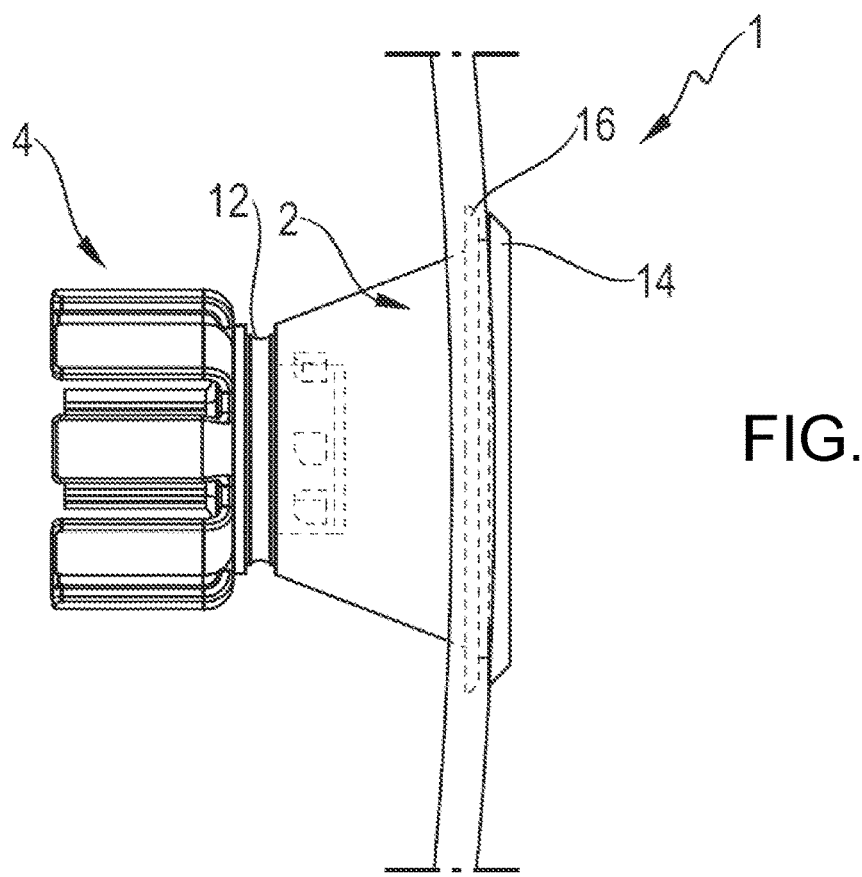
FIG. 2 is a side view of the vehicle component with the lighting unit according to the first embodiment.

In FIG. 2, the vehicle component 1 as shown in FIG. 1 is shown in a side view. It can be seen in FIG. 2 that the housing part 2 has on the side, at which it is connected to the vehicle component 1, a first collar 14 or radial collar which is supported at the vehicle component 1 at an outer surface and engages over the latter. In other words, the collar 14 projects somewhat beyond the vehicle component 1 in a radial direction away from the housing part 2. A projection of the housing part 2 beyond the vehicle component 1 is not mandatory, so that a flush embodiment is also conceivable. Furthermore, the housing part 2 has a further collar 16 which is spaced apart from the collar 14 in the longitudinal direction of the housing part 2 towards the lighting unit 4 in such a way that it is molded into the vehicle component 1. In other words, the collar 16 is surrounded by material from which the vehicle component 1 is formed. The housing part 2 is firmly fixed to the vehicle component 1 by the collars 14 and 16. The collars 14, 16 may further serve to position the housing part 2 in a die when the housing part 2 is overmolded to form the vehicle component 1.

Furthermore, it is shown in FIG. 2 that the part of the lighting unit 4 that extends from the seal 12 towards the vehicle component 1 is arranged in a blind-hole-shaped cylindrical recess of the housing part 2 when the housing part 2 is made of solid material. Furthermore, the blind-hole-shaped recess extending towards the vehicle component 1 has recesses which correspond to protrusions 10 of the projection part of the lighting unit 4. The protrusions 10 engage with the recesses of the housing part 1. That is, by rotating the lighting unit 4, the protrusions 10 engage with recesses of the housing part 2, and thus the lighting unit 4 can be mounted to the housing part. Baffles may be provided in the recess to guide the protrusions 10 during assembly until they reach a final position. When the housing part 2 is hollow, a cylindrical indentation may extend from a bottom surface of the housing part 2, which is arranged on the end side of the housing part 2 projecting away from the vehicle component, towards the vehicle component 1 as a receptacle for the lighting unit 4. The receptacle for the lighting unit 4 is preferably formed as an optical free-form surface, preferably so that the light from the lighting unit 4 can be in-coupled into the housing part 2 that is formed as an optical element, especially as a collimator. The wall may also have recesses into which the protrusions 10 can engage.

Figure 3:
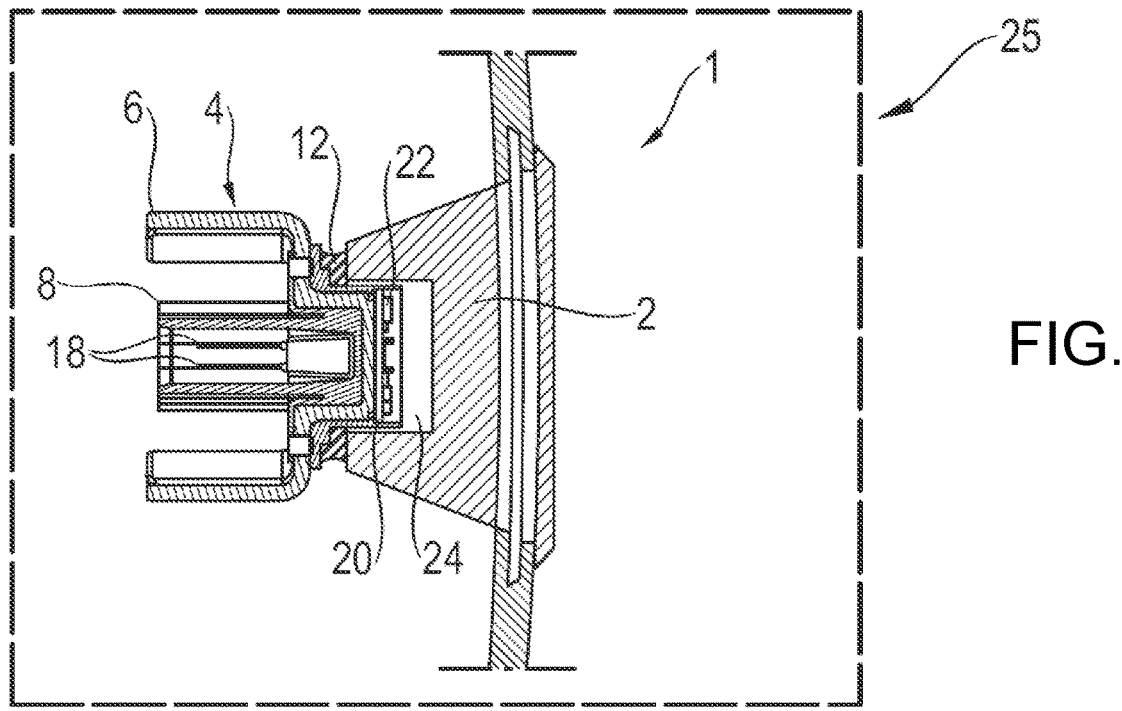
FIG. 3 is a longitudinal sectional view of the vehicle component with the lighting unit according to the first embodiment.

In FIG. 3, the vehicle component 1 according to the first embodiment of FIG. 1 is shown in a longitudinal section. In the longitudinal section, it can be seen that two electrical contacts 18 are integrated in the plug connection 8, with which the lighting unit 4 can be supplied with power. In addition, it is shown that the heat sink 6 extends below a printed circuit board 20, on which electronic components 22, such as also for example at least one light source—for example in the form of at least one LED—are arranged, which can be supplied with current especially through the plug connection 8. The electronic components 22 are arranged on a surface of the circuit board 20 that faces the vehicle component 1. The circuit board 20 and the electronic components 22 are cooled by the heat sink 6, that is, the heat generated by the electronic components 22 is dissipated by the heat sink 6.

Furthermore, the lighting unit 4 has a step shape in the region where the seal 12 is arranged. A first step with a small diameter is here embraced by the seal 12 and has the part of the lighting unit 4. A wider second step abuts the first step axially in a direction away from the vehicle component 1. At the step transition, the annular surface is formed on which the seal 12 is supported. The second step compresses the seal 12 such that the circuit board 20 with the electronic components 22 are sealed to the outside.

The cylindrical blind hole or the hollow-cylindrical wall of the housing part 2 may further comprise an in-coupling region 24 for light from the light source. The in-coupling region 24 may be provided with an anti-reflective coating to increase the in-coupling efficiency, if useful from an application and project perspective.

The vehicle component 1 may further be arranged on a vehicle 25, for example as a bumper.

Figure 4:
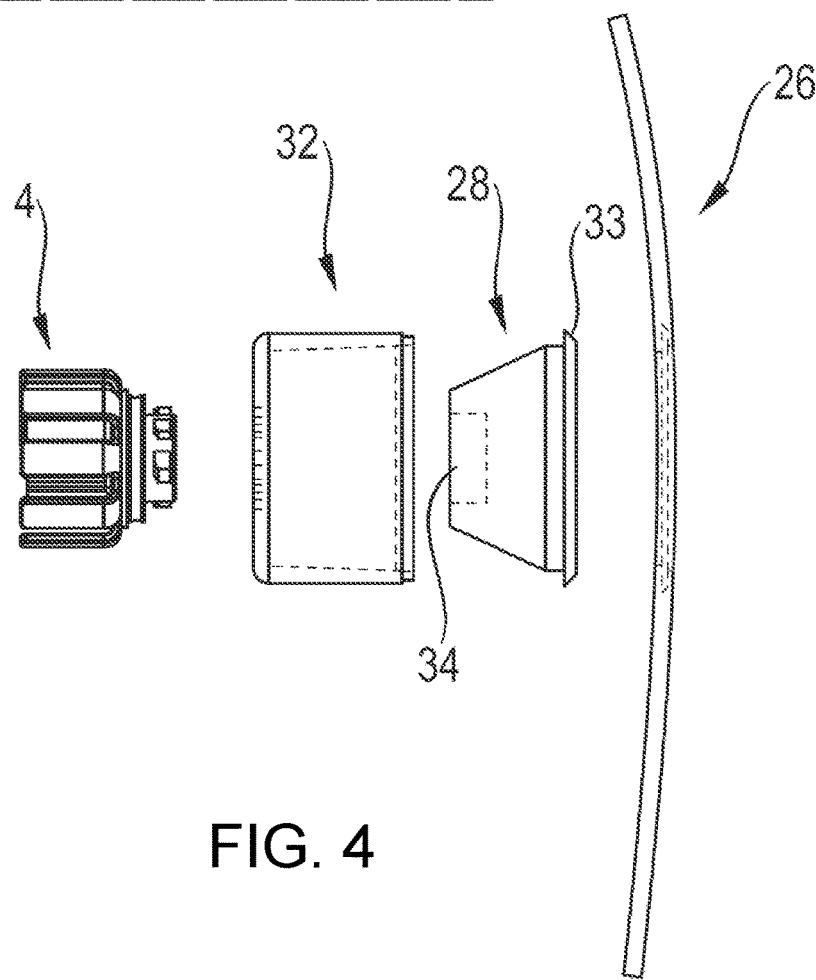
FIG. 4 is a side view and an exploded view of a vehicle component with the lighting unit and a connecting part according to a second embodiment.

In FIG. 4, an exploded view illustrating a vehicle component 26 is shown. This has a housing part 28, the lighting unit 4, that is constructed in the same way as the lighting unit 4 of FIGS. 1-3, and a connecting part 32.

The vehicle component 26 is connected to the housing part 28 in a materially bonded and/or form-fitting manner, and these are shown separately here for the purpose of a clearer illustration. The connecting part 32 is cup-shaped, whereby a cup bottom faces the lighting unit 4.

The housing part 28 is formed similarly to the housing part 2 of the first embodiment of FIGS. 1-3, that is, it is also formed in a frustoconical shape and has a collar 33 arranged at an end section provided on the vehicle component 26. It has an optical free-form surface, which in this embodiment is formed as a cylindrical blind hole 34 or hollow-cylindrical wall 34 (see FIG. 4 or FIG. 7) which extends inwardly into the housing part 28 towards the vehicle component 26 from an end section projecting away from the vehicle component 1.

Figure 5:
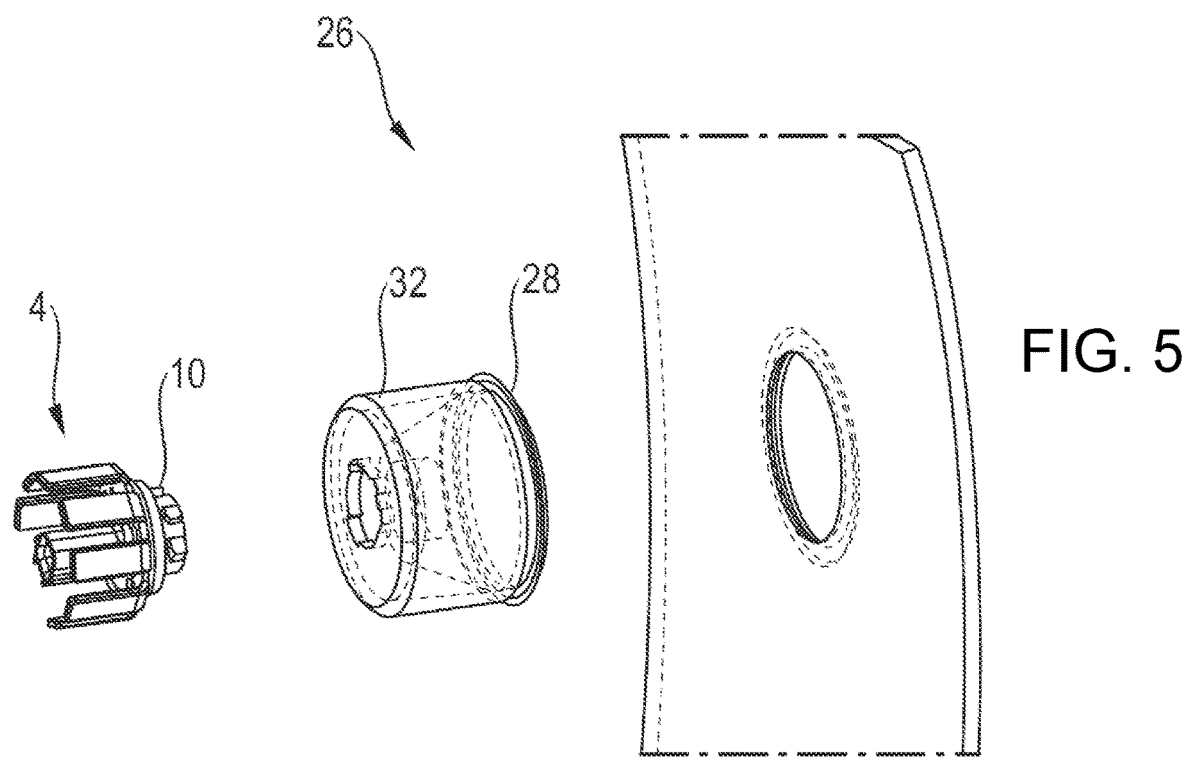
FIG. 5 is a perspective view and an exploded view of the vehicle component according to the second embodiment.

In FIG. 5, the vehicle component 26 is shown whereby the connecting part 32 is arranged at the housing part 28. The connecting part 32 is slipped over the housing part 28 and completely encloses the latter in a longitudinal direction of the housing part 28. Furthermore, the connecting part 32 has a cup-like shape whereby an end section is disposed at the end section of the housing part 28 provided on the vehicle component 26. From the end section of the housing part 28 provided on the vehicle component 82, the connecting part 32 extends hollow-cylindrically in a direction away from the vehicle component 26. In the cup bottom that is opposite to the end section provided on the end section of the housing part 28, the connecting part 32 has an opening into which the lighting unit 4 is insertable. Furthermore, the opening has recesses corresponding to the protrusions 10 of the lighting unit 4 in the negative. The protrusions 10 together with the recesses of the opening form a bayonet catch, and thus the lighting unit 4 can be mounted to the connecting part 32.

Figure 6:
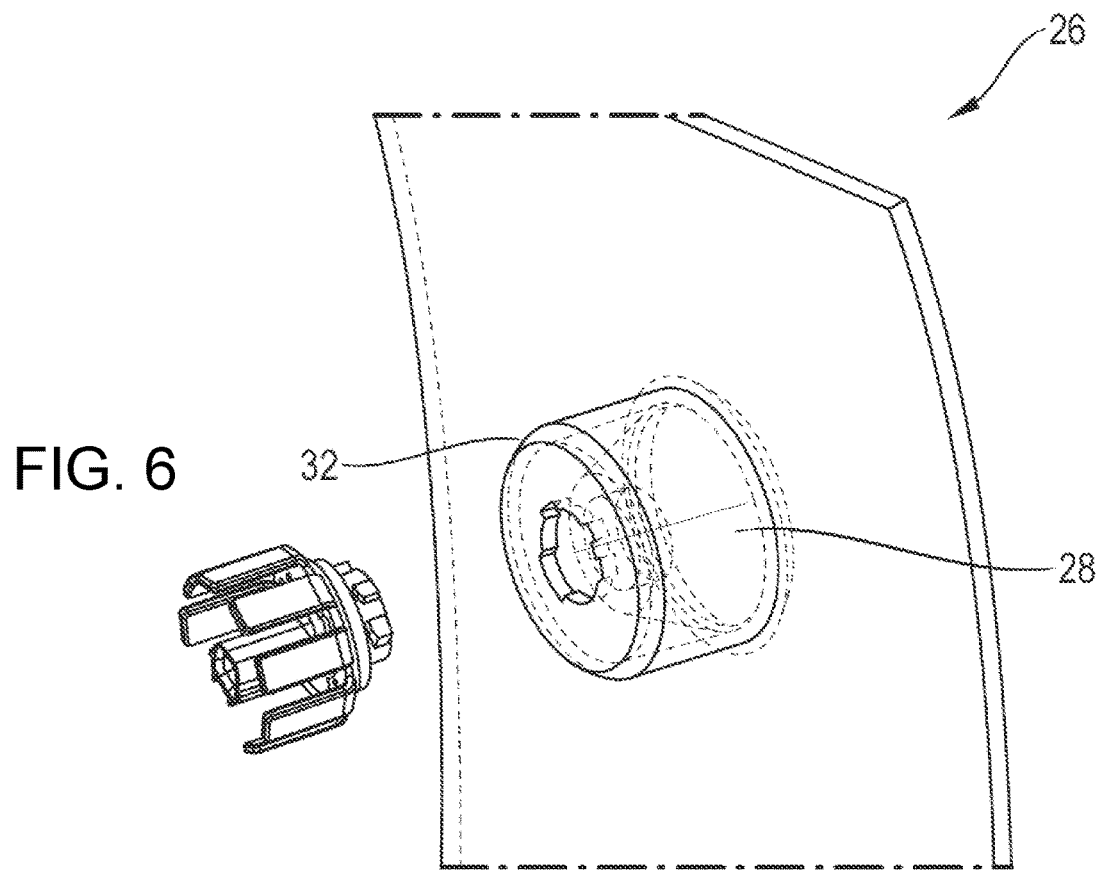
FIG. 6 is a perspective view of the vehicle component according to the second embodiment.

In FIG. 6, the vehicle component 26 is shown assembled together with the connecting part 32. That is, the housing part 28 that is overmolded by the vehicle component 26, is connected to the connecting part 32 at the transition between the vehicle component 26 and the housing part 28. As already described above, the connecting part 32 completely surrounds the housing part 28.

Like the housing part 2 of the first embodiment of FIGS. 1-3, the housing part 28 forms an optical element that is arranged in the same way as the optical element of the housing part 2. The housing part 28 may also be formed as an optical element as a whole.

Figure 7:
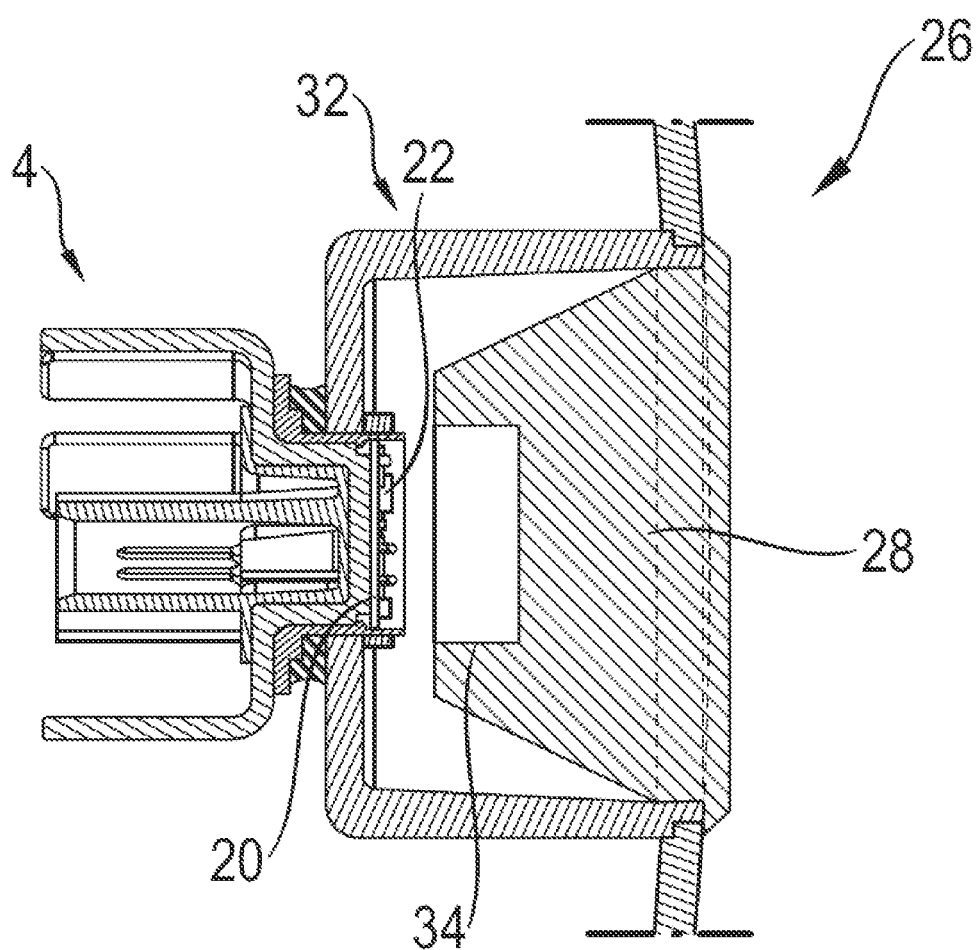
FIG. 7 is a longitudinal sectional view of the vehicle component with the lighting unit according to the second embodiment.

In FIG. 7, a longitudinal section of the vehicle component 26 is shown, wherein the lighting unit 4 is mounted on the connecting part 32. The connecting part 32 in turn is mounted to the vehicle component 26 and to the housing part 28. The housing part 28 has, like the housing part 2 of FIG. 1, the collar 33 by which the housing part 28 is supported on the vehicle component 26 towards the lighting unit 4. Furthermore, a gap is disposed between the housing part 28 and the remaining vehicle component 26 in a radial direction of the housing part 2. The connecting part 32 is arranged in the gap and fixed therein. It is possible, for example, for the connecting part 32 and the housing part 28 to be inserted into a die and then to be overmolded in a media-tight manner such that the vehicle component 26 is formed together with the housing part 28 and the connecting part 32. Alternatively, it is possible to overmold the housing part 28 and the connecting part 32, already connected to one another in a materially bonded and/or form-fitting manner, as a whole with the vehicle component 26.

However, it is also possible for the connecting part 32 to be mounted to the vehicle component 26 containing the housing part 28 by, for example, a screw connection, a laser welded connection or an adhesive connection. In other words, the housing part 28 may have a thread at its outer edge, where the radial gap is provided, and/or the vehicle component 26 may have a thread at the same location. The connecting part 32 may then also have a corresponding thread there either in the radial direction on the inside and/or on the outside.

Furthermore, FIG. 7 shows that the lighting unit 4 comprising the circuit board 20 and the electronic components 22 is arranged at a distance from the blind hole 34 or the wall 34 of the housing part 28. The blind hole 34 or the wall 34 may further form an in-coupling region for the light of the light source arranged on the circuit board 20 but not shown, and may be provided with an anti-reflective coating. The outer side of the housing part 28 that faces the connecting part may here be especially advantageously formed as a TIR surface because it is protected from dirt and water etc. by the cup structure of the connecting part 32. However, it is also possible to provide the outside of the housing part 28 with a reflective coating.

Figure 8:
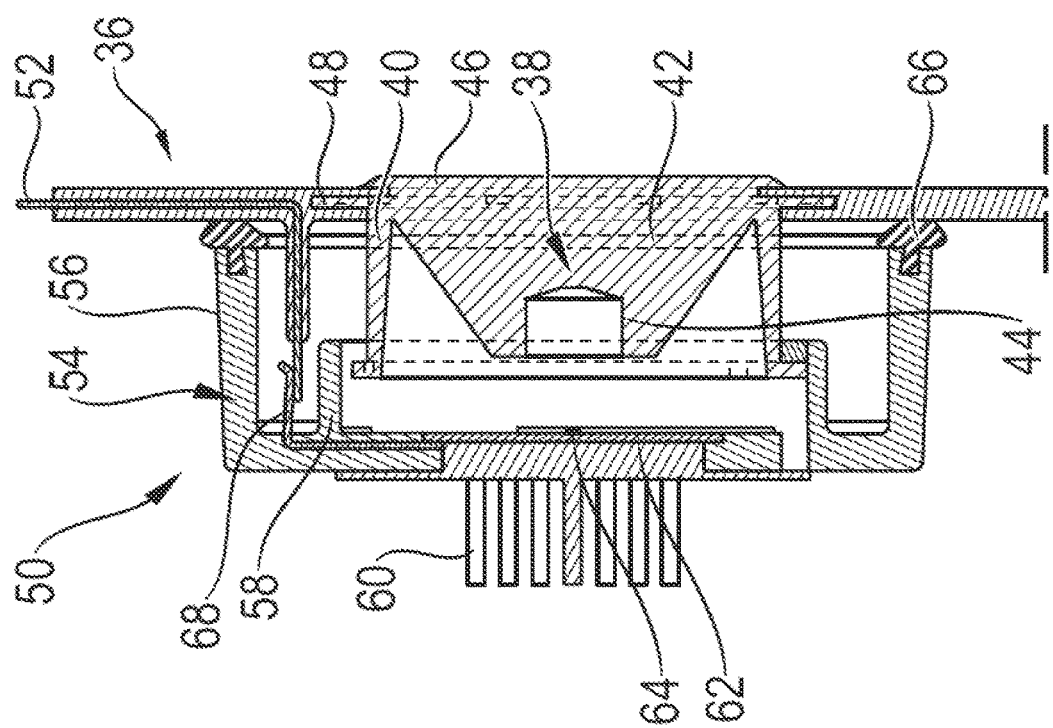
FIG. 8 is a longitudinal sectional view of a vehicle component with the lighting unit and an electrical contact according to a third embodiment.

In FIG. 8, FIG. 8 shows a vehicle component 36 that has a housing part 38. Housing part 38 has an inner frustoconical section 42 and a hollow-cylindrical wall 42 surrounding the latter. The section 42 may be formed as a wall. The section 42 of the housing part 38 has a blind hole 44 or an inwardly projecting wall 44, wherein the latter extends from the end section of the housing part 38 projecting away from the vehicle component 36 towards the vehicle component 36 into the interior of the housing part 38.

Like the housing part 2 of the FIGS. 1-3, the housing part 38 has two collars 46 and 48, whereby the housing part 38 is supported on the vehicle component 36 by the collar 46 in the direction of a lighting unit 50. The collar 48 is overmolded by the vehicle component 36. The collar 46 may possibly be omitted, such that the housing part 38 is flush with the vehicle component 36. In this case, the collar 48 assumes the sole support function.

Furthermore, the vehicle component 36 has an electrical contact 52 which is overmolded by the vehicle component 36 and projects adjacent to the housing part 38. The electrical contact 52 is inserted into the vehicle component 36 in a first portion perpendicular to the longitudinal direction of the vehicle component 36, thus this portion extends in a radial direction of the housing part 38 towards the housing part 38. A second portion is disposed essentially perpendicular to the first portion and projects longitudinally away from the vehicle component 36 towards the lighting unit 50. In other words, the electrical contact has an L-shape. Furthermore, the electrical contact 52 is surrounded to a large extent by the vehicle component. In other words, the electrical contact is also sheathed, at least in sections, in the region in which it projects away from the vehicle component 36 towards the lighting unit 50. Only an end section of the contact 52 is exposed in order to contact the lighting unit 50 therewith.

The lighting unit 50 has a light support 54 or connecting part that surrounds the projecting electrical contact 52 and the housing part 38 in a cup-shaped manner. The light support 54 has a first outer cup structure 56 which extends from a cup base of the light support 54 towards the vehicle component 36 and longitudinally and surrounds both the projecting electrical contact 52 and the housing part 38. Furthermore, the light support 54 has an inner cup structure 58 which is arranged inside the outer cup structure 56, and which is arranged between the electrical contact 52 and the housing part 38 as viewed in the radial direction, that is, the radius thereof is smaller than the radius of the outer cup structure 56. The inner cup structure 58 also extends from the cup bottom towards the vehicle component 36. However, the inner cup structure 58 extends only about half as far towards the vehicle component 36 as the outer cup structure 56.

The inner cup structure 58 also has an attachment means by which the light support 54, and thus the lighting unit 50, is attachable to the vehicle component 36. A heat sink 60 is arranged at the cup bottom of the light support 54. The heat sink 60 can cool a circuit board 62 and the light source 64 arranged on the circuit board, that is, can dissipate heat. The light source 64 is held by the light support 54 at a distance from the blind hole 44 or blind hole recess or wall, wherein the light source 64 is arranged on the longitudinal axis from the blind hole 44 or blind hole recess or the wall 44. In other words, the light source 64 is arranged, as viewed in the radial direction, centrally of the light support 54 and centrally of the housing part 38 so that the light from the light source 64 can be in-coupled efficiently into the optical free-form surface formed as blind hole, blind hole recess or inner wall 44, which is preferably coated with an anti-reflective coating and forms an in-coupling region.

Furthermore, the outer cup structure 56 of the light support 54 has a seal 66 that seals the interior of the cup structure 56 to the vehicle component 36 such that the housing part 38, which projects towards the light source 64, as well as the electrical contact 52 and the circuit board 62 are sealed.

In addition, an electrical contact 68 is overmolded by the light support 54 and extends from the circuit board 62 to the electrical contact 52 that is overmolded by the vehicle component 36. The electrical contact 68 is essentially L-shaped and projects away from the circuit board 62 in the radial direction and then perpendicularly thereto towards the vehicle component 36 and the electrical contact 52. The circuit board 62 with the light source 64 can be supplied with electrical power through the electrical contact. In other words, when the lighting unit 50 is attached or mounted to the vehicle component 36 with the housing part 38, the electrical connection between the electrical contacts 52 and 68 is made, and thus the light source 64 and the circuit board 62 are supplied with electrical power.

Figure 9:
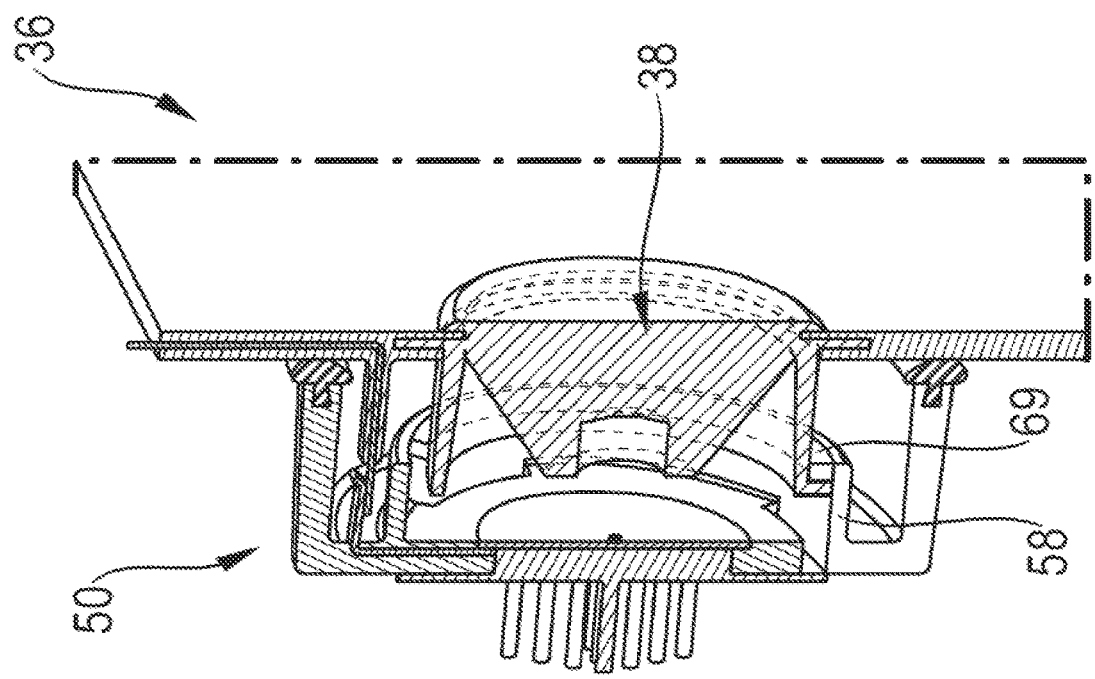
FIG. 9 is a perspective view of the longitudinal sectional view of FIG. 8.

In FIG. 9, the view of FIG. 8 is shown in perspective, whereby the attachment means between the housing part 38 and the inner cup structure 58 is visible. The inner cup structure 58 has protrusions 69 which extend radially inwardly from the cup structure 58 towards the housing part 38. The housing part 38 has corresponding recesses into which the protrusions 69 can engage, and thus the lighting unit 50 can be attached to the vehicle component 36.

Figure 10:
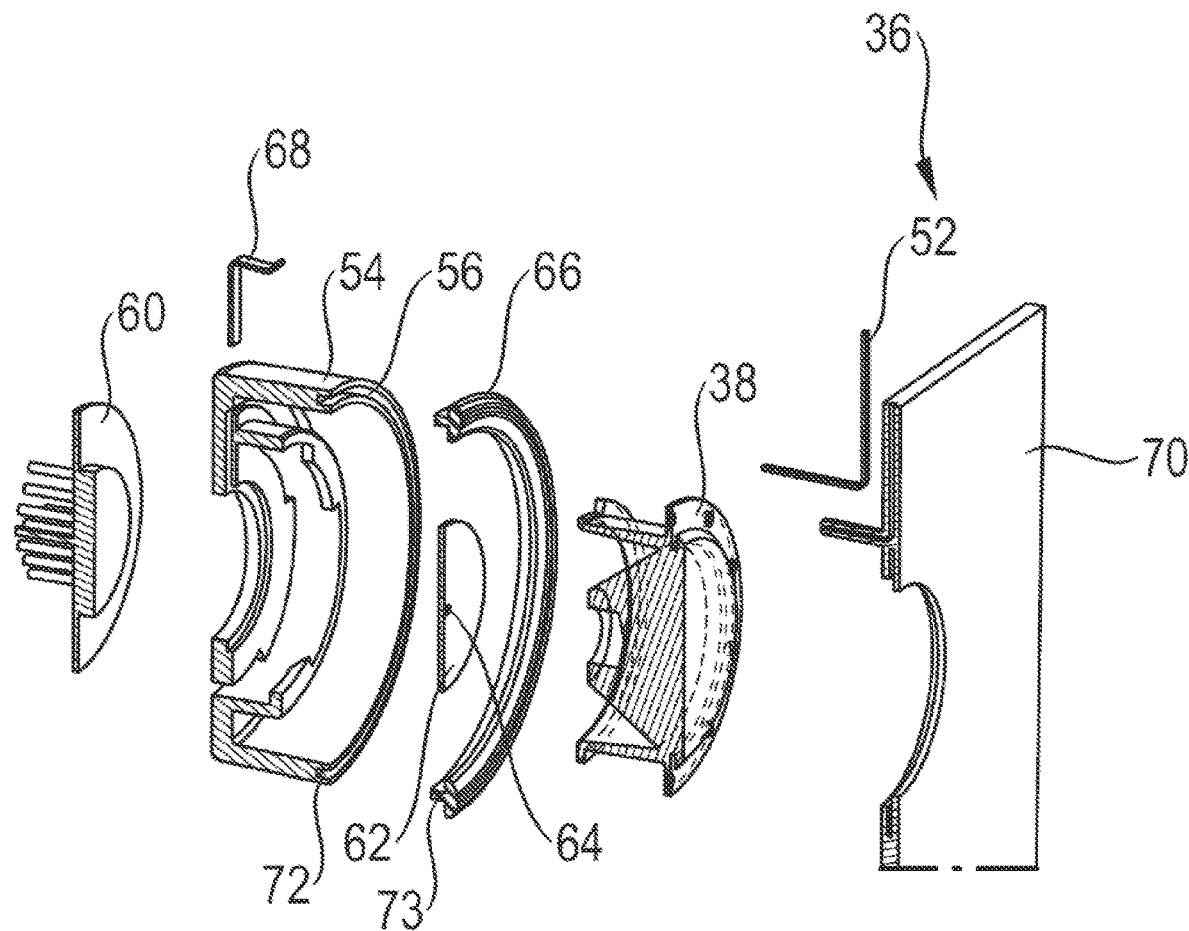
FIG. 10 is an exploded view of the vehicle component with the lighting unit according to the third embodiment.

FIG. 10 shows an exploded view of the vehicle component 36 with the lighting unit 50. The vehicle component 36 includes a base body 70 in which the electrical contact 52 and the housing part 38 are overmolded. The lighting unit 50 includes the heat sink 60, which is inserted into the light support 54 and on which the circuit board 62 having the light source 64 is disposed. The heat sink 60 and the circuit board 62 with the light source 64 are inserted into the light support 54. The heat sink 60 has a base plate from which cooling fins extend in a direction away from the vehicle component 36, each of the cooling fins being rod-shaped and evenly distributed on the surface. Furthermore, the heat sink 60 has a portion that extends from the thin base plate towards the vehicle component 36. On this portion, the circuit board 62 is arranged. Furthermore, the lighting unit 50 has the electrical contact 68 that is overmolded by the light support 54. The seal 66 is inserted into the edge of the cup structure 58 that extends away from the base. To accomplish this, the light support 54 has a groove 72 at the edge of the cup structure 56, and the seal 66 has a corresponding lip 73 that engages into the groove 72.

Figure 11:
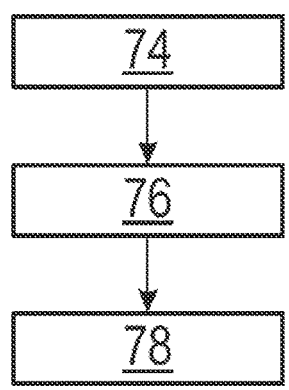
FIG. 11 is a flowchart of a first method of manufacturing the vehicle component.

In FIG. 11, a first flow diagram of a first method of manufacturing a vehicle component 1, 26, 36 with a housing part 2, 28, 38, as shown in the FIGS. 1 to 10, is shown, wherein in a first step 74, the housing part 2, 28, 38 is initially created. For example, the housing part 2, 28, 38 is injection molded and/or manufactured by another manufacturing method. Then, in a further, subsequent step 76, the previously manufactured housing part 2, 28, 38 is inserted into a die which is preferably suitable for injection molding. Once the housing part 2, 28, 38 is inserted and aligned in the die, it is overcast and/or overmolded in a further step 78 to obtain the vehicle component 1, 26, 36. In other words, the housing part 2, 28, 38 is materially bonded to the remaining vehicle component 1, 26, 36 by this method, and thus the vehicle component 1, 26, 36 is formed integrally with the housing part 2, 28, 38.

Figure 12:
FIG. 12 is a flow chart of a second method of manufacturing the vehicle component.

FIG. 12 shows a further flow diagram of a process for manufacturing a vehicle component 1, 26, 36, that is at least partially formed as a housing part 2, 28, 38. In a step 80, the vehicle component 1, 26, 36, that contains the housing part 2, 28, 38, is manufactured, especially by injection molding. A 2-component process may be used, i.e., the housing part 2, 28, 38 and the remaining vehicle component 1, 26, 36, that forms a bumper, for example, are made from different components, i.e., from different materials or the same material with different colors. Furthermore, a 1-component process may be used in which the entire vehicle component 1, 26, 36 that forms the housing part 2, 28, 38 is made from the same component, i.e., from the same material with the same color or translucence. Subsequently, the part that will later no longer be translucent may be painted partially and/or foiled.

Figure 13:
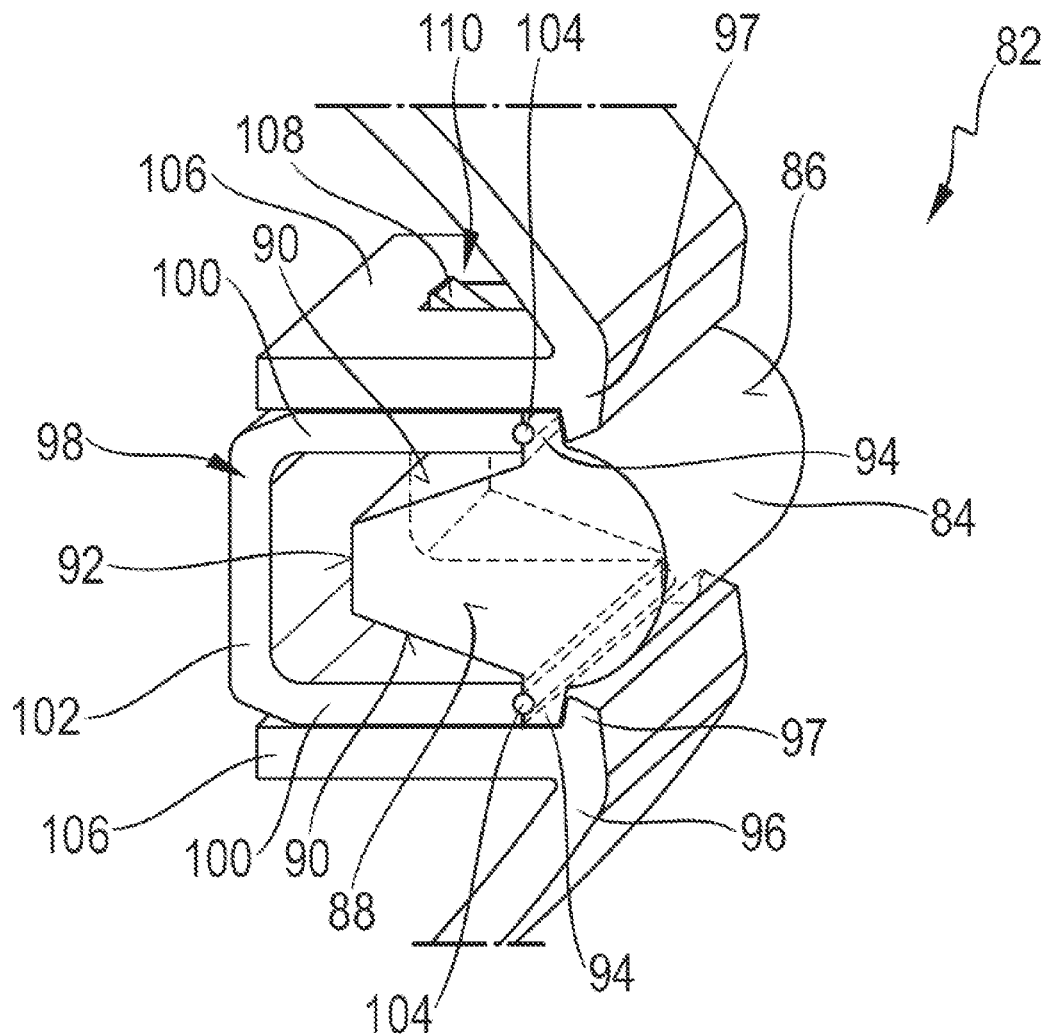
FIG. 13 is a perspective view of a section of a vehicle component with a protective element according to a further embodiment.

FIG. 13 shows a section of a vehicle component 82 that has a housing part 84. In this embodiment, this forms a light conductor. Furthermore, the housing part 84 is formed in such a way that it extends and tapers towards the interior of the vehicle away from the vehicle component 82 in a trapezoidal shape. Towards the outside of the vehicle, the housing part 84 extends away from the vehicle component 82 in a dome-shaped or semi-cylindrical manner. Overall, the housing part 84 has a generally drop-shaped cross-section form. The housing part 84 extends longitudinally, especially in a 3-D shape, in a curve or straight line, wherein a section of the vehicle component 82 is shown here. Light from at least one light source is in-coupled especially via at least one end surface or end face of the housing part 84, which is not shown here, because a section of the vehicle component 82 is shown here. It is also possible that light may be in-couplable into both ends, that is, into both end faces or end surfaces of the housing part 84. When light is in-coupled into one end face or end surface, it is possible that the other end surface or end face is reflectively coated to prevent parasitic out-coupling of light there. At least one of the end faces or end surfaces into which, especially, no light is in-coupled may have, for example, a drop-shaped form and be planar in design. At least one of the end faces or end surfaces into which light from a light source in-couples may have or form an in-coupling structure, such as a collimator.

One surface of the housing part 84 is a light-emitting surface 86, that is on the exterior of the vehicle. The light-emitting surface 86 extends longitudinally with an essentially semi-circular or arcuate cross-section, in a direction essentially perpendicular to a direction of radiation of the out-coupling light or, especially, as viewed in a plane extending in the vertical direction and, for example, in the direction of the longitudinal axis of the vehicle when the vehicle component is arranged in a front of a vehicle. Light that is in-coupled into the housing part 84 via at least one of the end surfaces or end faces out-couples from the light-emitting surface 86. Surfaces 88 are cross-section surfaces or cut surfaces of the housing part 84 and have a drop-shaped form. At least one of the end surfaces or end faces of the housing part 84 may, as described above, also have the drop-shaped form or at least one of the end surfaces or end faces of the housing part 84 into which the light from a light source in-couples may be formed as a collimator. Two lateral surfaces 90 extending from the light-emitting surface 86 towards the interior of the vehicle are not formed parallel to each other and converge towards each other. These are formed such that they limit the trapezoidal cross-section shape of the part of the housing part 84 that projects into the interior of the vehicle, and such that they converge towards each other from the light-emitting surface 86 to a light out-coupling surface 92. The converging areas 90 are preferably formed as TIR surfaces. They may also have a reflective design. The areas 90 are arranged, for example, one above the other, viewed in the vertical direction. The light out-coupling surface 92 preferably has at least one out-coupling structure with which the light in-coupled into the housing part 84 is guided towards the light-emitting surface 86. The out-coupling structure may comprise usual prism-like or sawtooth-like or other refractive recesses or thickenings. However, it is also conceivable that the out-coupling structures may be roughenings.

The housing part 84 widens, starting from the light out-coupling surface 92 in the radiation direction of the out-coupling light essentially up to the transition region between the inside and outside of the vehicle component 82, with a widening section. The latter is abutted by a section with the light-emitting surface 86, and laterally the housing part 84 is bounded by the surfaces 90.

In regions where the light-emitting surface 86 abuts the approaching surfaces 90, the housing part 84 has web-shaped projections 94. These are essentially square in cross-section, and project substantially over the entire length of the light conductor over which the housing part 84 extends. The projections 94 project essentially in a direction perpendicular to the direction of radiation. The projections 94 are arranged one above the other. The upper projection 94 extends upwards from the housing part 84, and the lower projection 94 extends downwards. In other words, the housing part 84 has a mounting flange. This is formed, for example, by the projections 94. At the web-shaped projections 94, the housing part 84 is supported at a part 96 of the vehicle component 82 that does not form the housing part 84. The part 96 of the vehicle component 82 that does not form the housing part 84 also has projections 97 that extend essentially in a direction perpendicular to the direction of radiation of the out-coupling light and towards the housing part 84. Furthermore, the projections 97 extend along the entire length of the projections 94. A respective surface of the projections 97 facing towards the interior of the vehicle abuts the respective surface of the web-shaped projections 94 of the housing part 84 facing towards the exterior of the vehicle. In other words, the projections 97 are formed as webs or bars. These are overlapped by the mounting flange, especially in the form of the projections 94. Seen from the outside, the webs lie in front of the mounting flange. The webs preferably extend at a parallel distance from each other and/or in a direction along the light conductor and/or parallel to the mounting flange.

Furthermore, a protective element 98 is provided. This is U-shaped. That is, it has a U-shaped cross-section and extends with the U-shaped cross-section in the same direction as the housing part 84, i.e., essentially perpendicular to the radiation direction of the out-coupling light and/or along the light conductor and/or the horizontal direction. The protective element 98 surrounds the part of the housing part 84 that extends in a trapezoidal cross-section from the vehicle component 82 towards the interior of the vehicle. The protective element 98 has two legs 100 extending from a bottom section 102, which is for example but not necessarily parallel to the light out-coupling surface 92 of the housing part 84, in the direction of radiation of the out-coupling light. The legs 100 extend parallel to each other from the bottom section 102 towards the exterior of the vehicle, but do not project from the vehicle component 82.

A respective seal 104 is arranged between the respective end faces or end surfaces of the legs 100, which are especially essentially perpendicular to the direction of radiation of the out-coupling light and to the extension direction of the legs 100, and a respective opposite surface of the projections 94 of the housing part 84, that are, respectively, facing towards the interior of the vehicle. The seals 104 are circular in cross-section and extend along the entire length of the protective element 98 essentially perpendicular to the direction of radiation of the out-coupling light.

The part 96 of the vehicle component 82, other than the housing part 84, has two projections 106 extending towards the interior of the vehicle and parallel to the legs 100 of the protective element 98. Respective outer surfaces of the legs 100 abut the respective projections 106. In other words, the protective element 98 is arranged between the projections 106, and the projections 106 surround the legs 100 of the protective element 98 and the trapezoidal part of the housing part 84 that projects towards the interior of the vehicle. On the respective outer surfaces of the legs 100, a respective latching lug 108 is provided which forms part of a latching connection or clip connection. Furthermore, a through-recess 110 is provided in the respective projection 106 as an corresponding part of the latching or snap connection into which the latching lug 108 can be inserted by elastic deformation. In the assembled state, the respective latching lug 108 is arranged in its original state in the respective through-recess 110, and thus the protective element 98 may be connectable to the vehicle component 82 by the latching connection. It is also possible that the latching connection is formed in such a way that the seals 104 between the respective end faces of the legs 100 and the respective surfaces of the projections 94 of the housing part 84 facing to the inside of the vehicle are compressed in a direction perpendicular to the radiation direction. This is advantageous because this serves as sealing and also as an elastic element and contributes, for example, to a stable, firmly mounted, non-wobbling assembly of the protective element 98 to the vehicle component 82.

| Reference Numerals | |
| --- | --- |
| Vehicle component | 1, 26, 36, 82 |
| Housing part | 2, 28, 38, 84 |
| Lighting unit | 4, 50 |
| Heat sink | 6, 60 |
| Plug connection | 8 |
| Protrusions | 10, 69 |
| Seal | 12, 66, 104 |
| Collar | 14, 16, 33, 46, 48 |
| Electrical contact | 18, 52, 68 |

-continued

| Reference Numerals | |
| --- | --- |
| Circuit board | 20, 62 |
| Electronic component | 22 |
| In-coupling region | 24 |
| Vehicle | 25 |
| Connecting part | 32 |
| Blind hole or wall | 34, 44 42 |
| Optical element | 3 |
| Wall | 40 |
| Light support | 54 |
| Cup structure | 56, 58 |
| Light source | 64 |
| Base body | 70 |
| Groove | 72 |
| Lip | 73 |
| Steps | 74, 76, 78, 80 |
| Light-emitting surface | 86 |
| Cross-section surface | 88 |
| Surfaces | 90 |
| Light out-coupling surface | 92 |
| Projection | 94, 97, 106 |
| Part of the vehicle component | 96 |
| Protective element | 98 |
| Leg | 100 |
| Latching lug | 108 |
| Through-recess | 110 |

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A vehicle component comprising:
a housing part of a light housing; and
a light emitter adapted to be inserted into the light housing, wherein the housing part forms an optical element, wherein the housing part is at lease partially translucent, and wherein the vehicle component is a component selected from the group consisting of: a trim part, a body part, a bumper, and an exterior mirror, wherein the housing part is formed as an optical free-form surface that tapers in the direction away from the vehicle component, and wherein the tapered surface is reflective.

2. The vehicle component of claim 1, wherein the light emitter is integrated into the housing part.

3. The vehicle component of claim 1, wherein the housing part is connected to the vehicle component in a form-fitting manner.

4. The vehicle component of claim 1, wherein the housing part is integrally formed with the vehicle component.

5. The vehicle component of claim 1, wherein light emitted from the light emitter radiates through the optical element.

6. The vehicle component of claim 1, wherein the light emitter is mounted to the housing part.

7. The vehicle component of claim 1, further comprising:
a connecting part, wherein the light emitter is attached to the connecting part, and wherein the connecting part is attached to the housing part; and
a protective element with a U-shaped cross section that surrounds the light emitter.

8. The vehicle component of claim 7, wherein the light emitter, the connecting part and the housing part are aligned along a path in which the light emitter emits light.

9. The vehicle component of claim 1, wherein the optical element is selected from the group consisting of: a collimator, a light conductor, and a lens.

10. The vehicle component of claim 1, wherein the optical element is at least partially refractive.

11. The vehicle component of claim 1, further comprising: an annular seal disposed between the light emitter and the housing part, wherein the annular seal seals an electronic component of the light emitter from moisture.

12. The vehicle component of claim 1, wherein the housing part is made of a solid material.

13. The vehicle component of claim 1, wherein the light emitter is attached to the optical element by a standardized connection.

14. The vehicle component of claim 1, further comprising: an electrical contact integrated into the vehicle component, wherein the electrical contact is molded together with the light housing, and wherein the electrical contact connects the light emitter and to a source of electrical power.

15. The vehicle component of claim 1, wherein the optical element is frustoconical in shape with a circular cross-section, wherein the housing part has a frustoconical shell that tapers into a vehicle interior, and wherein the shell has a reflective surface.

16. The vehicle component of claim 1, wherein the housing part has a trapezoidal shape that tapers into a vehicle interior, and wherein the trapazoidal shape of the housing part has two converging surfaces that are reflective.

17. A vehicle comprising:
an exterior surface of the vehicle; and
a vehicle component including a housing part and a light emitter, wherein the light emitter is adapted to be inserted into the housing part, wherein the housing part forms an optical element, wherein the housing part is at least partially translucent, wherein the optical element and the exterior surface form a continuous surface, and wherein the exterior surface is disposed on a vehicle part selected from the group consisting of: a trim part, a body part, a bumper, and an exterior mirror,
wherein the optical element is elongated and arranged along a longitudinal axis of the vehicle.

18. A method of manufacturing a vehicle component, comprising:
making a housing part that includes an optical element, wherein the housing part is at least partially translucent;
inserting the housing part into a mold;
overmolding the housing part to form the vehicle component, wherein the vehicle component includes an exterior portion of a vehicle that is integrally formed with the housing part; and
inserting a light emitter into the housing part.

19. The method of claim 18, wherein the making of the housing part is performed by injection molding.

20. The method of claim 18, wherein the exterior portion of the vehicle is located on a vehicle component selected from the group consisting of: a trim part, a body part, a bumper, and an exterior mirror.

21. The method of claim 18, wherein the inserting of the light emitter into the housing part involves attaching the light emitter to a connecting part and attaching the connecting part to the housing part.

22. The method of claim 18, wherein the overmolding the housing part to form the vehicle component involves overmolding the housing part together with an electrical contact to form the vehicle component.

* * * * *

UNITED STATES PATENT AND TRADEMARK OFFICE
CERTIFICATE OF CORRECTION

| | | |
|---|---|---|
| PATENT NO. | : 12,181,118 B2 | Page 1 of 1 |
| APPLICATION NO. | : 17/605519 | |
| DATED | : December 31, 2024 | |
| INVENTOR(S) | : Juergen Hager et al. | |

It is certified that error appears in the above-identified patent and that said Letters Patent is hereby corrected as shown below:

On the Title Page

The International Application No. found after Item (86) should read:
PCT No.: PCT/EP2020/062865

In the Specification

In Column 1, Lines 2-3, the International Application No. should read:
PCT/EP2020/062865

Signed and Sealed this
Eighteenth Day of March, 2025

Coke Morgan Stewart
*Acting Director of the United States Patent and Trademark Office*